United States Patent [19]

Imamura

[11] Patent Number: 4,590,669
[45] Date of Patent: May 27, 1986

[54] METHOD OF PREPARING RESISTANCE THERMOMETER

[75] Inventor: Iku Imamura, Fujimi, Japan
[73] Assignee: Netsushin Co., Ltd., Tokyo, Japan
[21] Appl. No.: 670,940
[22] Filed: Nov. 13, 1984
[51] Int. Cl.$^4$ ............................................. H01C 17/02
[52] U.S. Cl. ...................................... 29/612; 29/613; 374/208; 228/115
[58] Field of Search ...................... 29/610 R, 612–618; 338/25, 28–30; 374/208, 185, 179; 228/115, 116, 219

[56] References Cited

U.S. PATENT DOCUMENTS

| | | | |
|---|---|---|---|
| 2,491,688 | 12/1949 | Pickels, IV | 29/613 |
| 2,894,323 | 7/1959 | Sowter et al. | 228/115 |
| 2,926,030 | 2/1960 | Rozmus et al. | 228/115 |
| 3,937,383 | 2/1976 | Sawert | 228/115 |
| 4,242,659 | 12/1980 | Baxter et al. | 338/28 |

FOREIGN PATENT DOCUMENTS 8575  1/1979  Japan .................... 374/185

Primary Examiner—Howard N. Goldberg
Assistant Examiner—P. W. Echols
Attorney, Agent, or Firm—Stephen F.K. Yee

[57] ABSTRACT

A resistance thermometer having a resistance temperature detector (RTD) element fixedly supported within a tubular metallic sheath by a compacted insulating material is manufactured by integrally connecting in series two tubular metallic sheaths by pressure welding. The first sheath has a smaller diameter portion which can be inserted into and received by the second sheath. The manufacture method includes the steps of: supporting electrical conductors in the first sheath using the insulating material, electrically joining the RTD element to the conductors supported in the first sheath, putting a metallic ring on the smaller diameter portion of the first sheath, inserting the smaller diameter portion of the first sheath into the second sheath with the RTD element being accommodated within the second sheath, and ramming the metallic ring radially inwardly so that the first and second sheaths are integrally bonded by pressure welding. After the pressure welding, the second sheath is filled with the insulating material for fixation of the RTD element and a closure element is attached to the open end of the second sheath to complete the resistance thermometer.

5 Claims, 7 Drawing Figures

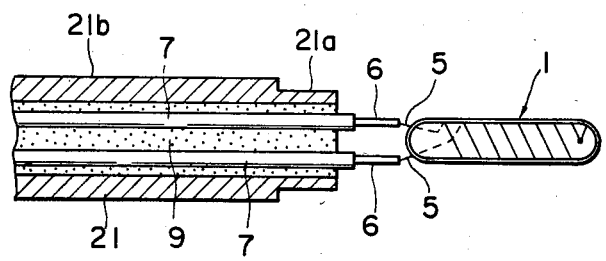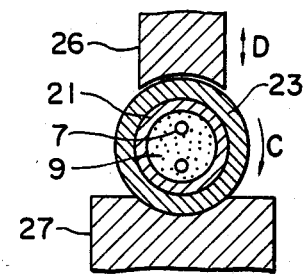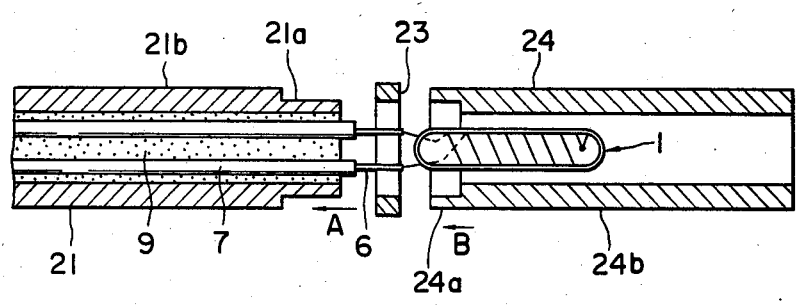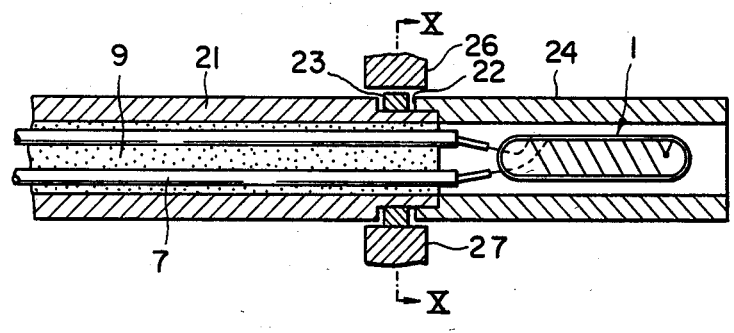

METHOD OF PREPARING RESISTANCE THERMOMETER

BACKGROUND OF THE INVENTION

This invention relates to a method of preparing a resistance thermometer having a resistance temperature detector element provided in a metallic sheath and operating by measuring the electric resistivity of the element, the resistance of which is a known function of its temperature.

An example of the conventional resistance thermometer of the above-mentioned type is schematically illustrated in FIG. 7, in which indicated generally by the reference numeral 1 is a resistance temperature detector element (hereinafter referred to as "RTD element"). The RTD element includes a mandrel 2 formed of an insulating material such as a glass, and two resistance wires 3, such as platinum wires, wound helically on the mandrel 2. The resistance wires 3 have respective terminal ends joined with each other so that the RTD element has a predetermined electric resistivity. The mandrel 2 and the winding 3 are surrounded by a cover 4 formed of a suitable insulating material such as glass. Designated by the reference numeral 5 are terminal leads of the winding 3. The terminal leads 5 extend from the cover 4 and are electrically connected to associated conductors 7 by means of intermediate connecting wires 6 which have a larger cross sectional area than that of the terminal leads 5 and which are in the form of thin ribbons. The RTD element 1 and the conductors 7 are located within a metallic sheath 8 of a very small diameter and supported and insulated from the metallic sheath 8 by means of a firmly compacted mass 9 of a finely divided, insulating material such as a metal oxide, for example, magnesium oxide. The conductors 7 have respective terminal ends connected to the circuitry (not shown).

The resistance thermometer of the above-mentioned type has been generally manufactured so far by the following method: The conductors 7 are inserted in a first metallic sheath 10 and supported in position by filling the space within the sheath 10 with the insulating material 9. The conductors 7 are joined to the terminal leads 5 of the RTD element using the intermediate connecting wires 6 by welding. A second metallic sheath 11 is then connected to the first sheath 10 by arc welding while maintaining both sheaths 10 and 11 in abutting engagement with each other. The reference numeral 13 in FIG. 7 designates a welded portion between the first and second sheaths 10 and 11. The space within the second sheath 11 is then filled with the insulating material 9 to fix the RTD element 1 in position. Finally, the open end of the second sheath 11 is closed by a closure 12 to complete the resistance thermometer.

The above-described conventional method has been found to have a drawback because the arc welding for integrally connecting the first and second sheaths 10 and 11 is apt to cause the melting of the conductors 7 and intermediate connecting wires 6 or junctures therebetween, which results in the electrical disconnection between the RTD element and the circuitry. In order to prevent such melting, therefore, it is necessary to use metallic sheaths having a large diameter and to provide a sufficient space between the conductors 7 and the sheaths. This is, however, disadvantageous because it is desirable that the metallic sheath have as small a diameter as possible.

SUMMARY OF THE INVENTION

It is, therefore, an object of the present invention to provide a method of preparing a resistance thermometer, which is devoid of the drawback involved in the conventional method.

It is a special object of the present invention to provide a simple method by which a resistance thermometer with a very thin metallic sheath, say a diameter of about 1 mm, may be obtained.

In accomplishing the foregoing objects, there is provided in accordance with the present invention a method of preparing a resistance thermometer, which comprises providing:

a first tubular metallic sheath within which electrical conductors are supported by an electrical insulator and which has a first portion with a first outer diameter and a second portion with a second outer diameter greater than the first outer diameter, a metallic ring having an outer diameter greater than that of the second outer diameter and an inner diameter dimensioned so that the first portion of the first sheath may be inserted into the metallic ring, a second tubular metallic sheath having substantially the same outer diameter as that of the second outer diameter of the first sheath and a first portion with a first inner diameter dimensioned so that the first portion of the first sheath can be inserted into the first portion of the second sheath with a close fit, and a resistance temperature detector element with terminal leads extending therefrom. The terminal leads of the resistance temperature element are joined to associated conductors contained in the first sheath and the metal ring is then put on the first portion of the first sheath. Thereafter, the first portion of the first sheath is inserted into the first portion of the second sheath with the resistance temperature detector element being accommodated in the second sheath. The resulting assembly is then processed by ramming the metallic ring radially inwardly so that the first and second sheaths are integrally connected by pressure welding. The space within the second sheath is then filled with an electrical insulator from the open end thereof and a closure member is attached to the open end of the second sheath to complete the desired resistance thermometer.

BRIEF DESCRIPTION OF THE DRAWINGS

Other objects, features and advantages of the present invention will become apparent from the detailed description of the invention which follows, when considered in light of the accompanying drawings, in which:

FIGS. 1 through 5 are fragmentary, cross-sectional views illustrating the manner in which the resistance thermometer is manufactured in accordance with the method of the present invention, FIG. 4 being a cross-section taken on line X—X in FIG. 3;

DETAILED DESCRIPTION OF THE INVENTION

Figure 5:
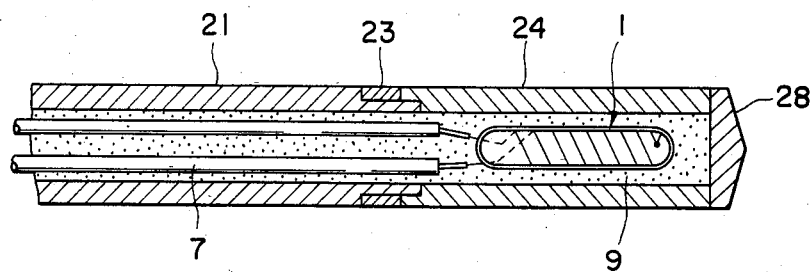

Referring now to FIGS. 1 through 5, the method according to the present invention uses two, first and second tubular metallic sheaths 21 and 24 which are to be assembled for mounting therein a RTD element generally indicated by the reference numeral 1.

The first sheath 21 has a first portion 21a having a first outer diameter and a second portion 21b having a second outer diameter which is greater than the first outer diameter. The first metallic sheath is preferably formed of a stainless steel, such as stainless steel SUS 316. Retained within the first sheath 21 are electrical conductors 7 (two in number, in the specific embodiment shown). The conductors 7 are supported by a refractory material 9, for example, finely pulverized magnesium oxide, and are connected to associated terminal leads 5 of the RTD element through intermediate connecting wires 6 as shown in FIG. 1. Thus, the conductors 7 are welded to one end of respective connecting wires 6 and the terminal leads 5 are welded to the other end of respective connecting wires 6.

Then, a metallic ring 23 is put on the first portion 21a of the first sheath 21 by moving same in the direction as illustrated by the arrow A in FIG. 2. The ring 23 has an outer diameter greater than the second outer diameter of the second portion 21b of the first sheath 21 and such an inner diameter as to permit the insertion of the first portion 21a therethrough. Preferably, the ring 23 has an inner diameter slightly greater than the first outer diameter of the first portion 21a for engagement therewith with a close fit. The metallic ring 23 is preferably formed of the same material as that of the first sheath 21.

After fitting the ring 23 on the first portion 21a of the first sheath 21, the second sheath 24 is put on the first portion 21a by moving same in the direction as shown by the arrow B in FIG. 2. The second sheath 24 has substantially the same outer diameter as the second diameter of the second portion 21b of the first sheath 21 and is, preferably, formed of the same material as that of the first metallic sheath 21. The second sheath 24 has a first portion 24a with a first inner diameter and a second portion 24b with a second inner diameter smaller than the first inner diameter. The first inner diameter is so sized that the first portion 21a of the first sheath 21 may be inserted into and be received coaxially by the first portion 24a of the second sheath 24 with a close fit.

In the method of the present invention, after mounting the metallic ring 23 on the first portion 21a of the first sheath 21, the second sheath 24 is attached thereto by moving same in the direction shown by the arrow B, thereby obtaining the assembly as shown in FIG. 3.

As seen from FIG. 3, the length of the first portion 21a of the first sheath 21 is greater than the length of the first portion 24a of the second sheath 24. As a result, when the second sheath is connected to the first sheath 21, there is defined a peripheral groove 22 between the sheaths 21 and 24. Further, the first portion 21a has a length so that the length of the groove 22 in the axial direction is greater than that of the ring 23. The volume of the ring 23 is generally larger than or the same as that of the groove 22. The inner diameter of the first sheath 21 is generally the same as that of the second inner diameter of the second portion 24b of the second sheath, though they may have different diameters from each other. In FIG. 3, the reference numerals 26 and 27 designate a ram and a die, respectively, of a pressure welding machine (not shown).

The assembly obtained from the step illustrated in FIG. 2 is subjected to a pressure welding treatment for integrally and firmly connecting the first and second sheaths 21 and 24 together. As shown in FIG. 4 which is a cross section taken along line X—X in FIG. 3, the pressure welding treatment is effected by ramming or striking the ram head 26 repeatedly against the metallic ring 3, while continuously or intermittently rotating, in the direction shown by the arrow C, the whole assembly on the die 27. Through the ramming treatment, the ring 23 deforms and fills the space in the groove 22 and is pressure welded both to the first and second sheaths 21 and 24 so that both sheaths 21 and 24 are integrally connected with each other. The pressure welding is preferably performed in an inert or substantially oxygen-free atmosphere, such as in an atmosphere of argon, to prevent the oxidation of the metals at surfaces.

After the welding, the space within the second sheath 24 is filled with the insulating substance 9 for fixing the RTD element in position. Then a closure plate or plug 28 is attached, generally by arc welding, to the open end of the second sheath 24 to obtain the resistance thermometer (FIG. 5).

Figure 6:
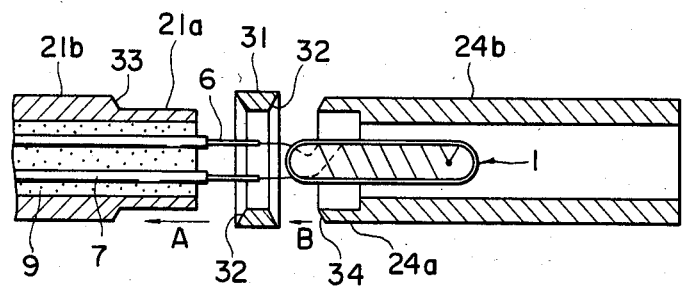
FIG. 6 is a fragmentary, cross-sectional view, similar to FIG. 2, schematically showing an alternate embodiment according to the present invention.
Figure 7:
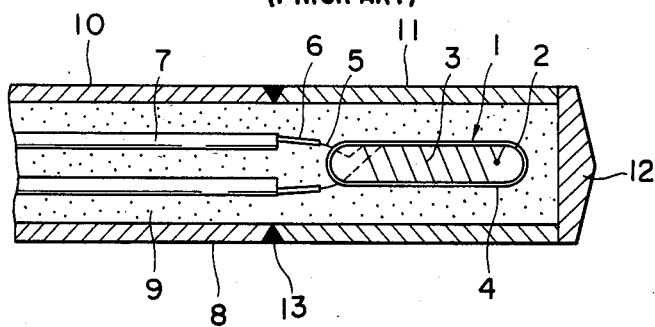
FIG. 7 is a fragmentary, cross-sectional view diagrammatically illustrating a resistance thermometer prepared according to the conventional method.

FIG. 6 shows an alternate embodiment of the present invention, in which like numerals designate like component parts. In this embodiment, the first and second sheaths 21 and 24 have tapered ends 33 and 34 and the ring 23 has a trapezoidal cross-section. Such tapered faces are preferable because the area of the interface at which the ring 23 engages with the first and second sheaths 21 and 24 by pressure welding is increased and the tapered faces receive more intensive ramming forces, whereby giving firm connection between the first and second sheaths 21 and 24.

The order of the steps in the above-described method can be varied, if desired. Further, the number of the conductors 7 may be increased to 3 or more. As the RTD element, it is possible to use a ceramic element. The ring 23 can be C-shaped ring having a disconnected portion and formed by curving a wire having a suitable cross-section such as round or trapezoid.

According to the method of the present invention, there involves no problem of fusing or deterioration of the sheaths, RTD element, terminal leads of the RTD element, conductors, joints between the conductors and the terminal leads by heat, which would be encountered in the conventional method utilizing arc welding. Therefore, it is possible to use very thin sheaths. For example, the method of the present invention makes it possible to produce a resistance thermometer whose sheath is only 1 mm or less in outer diameter.

I claim:
1. A method of preparing a resistance thermometer, comprising the steps of:
   (a) providing
      a first tubular metallic sheath containing therewithin electrical conductors insulated from each other and from said first sheath by an electrical insulator and including a first portion with a first outer diameter, and a second portion with a second outer diameter which is greater than said first diameter,
      a metallic ring having an outer diameter greater than that of said second outer diameter and an inner diameter dimensioned so that said first portion of said first sheath may be inserted into said metallic ring, a second tubular metallic sheath having substantially the same outer diameter as said second outer diameter and including a first portion with a first inner diameter so that said first portion of said first sheath can be inserted into said first portion of said second sheath with a close fit, and a resistance temperature detector element with terminal leads;

(b) joining the terminal leads of said resistance temperature detector element to associated conductors supported in said first sheath;

(c) putting said metal ring on said first portion of said first sheath;

(d) inserting said first portion of said first sheath into said first portion of said second sheath with said resistance temperature detector element being accommodated in said second sheath;

(e) ramming said metallic ring radially inwardly so that said first and second sheaths are integrally connected by pressure welding;

(f) filling said second sheath with an electrical insulator from the open end thereof to fix said resistance temperature detector element in position; and (g) attaching a closure to the open end of said second sheath.

2. The method as claimed in claim 1, wherein the ramming step (e) is performed in a substantially oxygen-free atmosphere.

3. The method as claimed in claim 1, wherein said first and second sheaths and said metallic ring are formed of the same material.

4. The method as claimed in claim 1, wherein said second sheath has a second portion having an inner diameter smaller than that of said first portion of said second sheath.

5. The method as claimed in claim 4, wherein said first sheath has the same inner diameter as that of said second portion of said second sheath.

* * * * *